(12) United States Patent
Pooser et al.

(10) Patent No.: US 12,181,773 B2
(45) Date of Patent: Dec. 31, 2024

(54) TRUNCATED NONLINEAR INTERFEROMETER-BASED SENSOR SYSTEM

(71) Applicant: UT-Battelle, LLC, Oak Ridge, TN (US)

(72) Inventors: Raphael C. Pooser, Oak Ridge, TN (US); Benjamin J. Lawrie, Oak Ridge, TN (US); Petro Maksymovych, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 93 days.

(21) Appl. No.: 18/100,157

(22) Filed: Jan. 23, 2023

(65) Prior Publication Data
US 2023/0161220 A1 May 25, 2023

Related U.S. Application Data

(60) Continuation of application No. 17/472,269, filed on Sep. 10, 2021, now Pat. No. 11,561,453, which is a (Continued)

(51) Int. Cl.
*G01Q 60/24* (2010.01)
*B82Y 35/00* (2011.01)
(Continued)

(52) U.S. Cl.
CPC ............ *G02F 1/3538* (2013.01); *B82Y 35/00* (2013.01); *G01B 9/02* (2013.01); *G01B 9/02003* (2013.01);
(Continued)

(58) Field of Classification Search
CPC ......... G02F 1/3538; B82Y 35/00; G01B 9/02; G01B 9/02003; G01B 9/02079;
(Continued)

(56) References Cited

U.S. PATENT DOCUMENTS 11,119,386 B2 * 9/2021 Pooser ............... G01B 9/02003
11,561,453 B2 * 1/2023 Pooser ................... G01Q 60/38
(Continued)

*Primary Examiner* — Jonathan M Hansen
(74) *Attorney, Agent, or Firm* — LEMPIA SUMMERFIELD KATZ LLC

(57) ABSTRACT

A truncated non-linear interferometer-based sensor system includes an input port that receives an optical beam and a non-linear amplifier that amplifies the optical beam with a pump beam and renders a probe beam and a conjugate beam. The system's local oscillators have a relationship with the respective beams. The system includes a sensor that transduces an input with the probe beam and the conjugate beam or their respective local oscillators. It includes one or more phase-sensitive detectors that detect a phase modulation between the respective local oscillators and the probe beam and the conjugate beam. Output from the phase-sensitive-detectors is based on the detected phase modulation. The phase-sensor-detectors include measurement circuitry that measure the phase signals. The measurement is the sum or difference of the phase signals in which the measured combination exhibit a quantum noise reduction in an intensity difference or a phase sum or an amplitude difference quadrature.

26 Claims, 10 Drawing Sheets

Related U.S. Application Data division of application No. 16/719,437, filed on Dec. 18, 2019, now Pat. No. 11,119,386.

(51) Int. Cl.
| | |
|---|---|
| *G01B 9/02* | (2022.01) |
| *G01B 9/02003* | (2022.01) |
| *G01B 9/02055* | (2022.01) |
| *G01N 21/45* | (2006.01) |
| *G01Q 20/02* | (2010.01) |
| *G01Q 60/38* | (2010.01) |
| *G02F 1/29* | (2006.01) |
| *G02F 1/35* | (2006.01) |
| *H01S 3/10* | (2006.01) |

(52) U.S. Cl.
CPC ..... *G01B 9/02079* (2013.01); *G01B 9/02081* (2013.01); *G01N 21/45* (2013.01); *G01Q 20/02* (2013.01); *G01Q 60/24* (2013.01); *G01Q 60/38* (2013.01); *G02F 1/29* (2013.01); *H01S 3/10076* (2013.01); *G01B 2290/55* (2013.01)

(58) Field of Classification Search
CPC ............ G01B 9/02081; G01B 2290/55; G01B 9/02001; G01Q 20/02; G01Q 60/24; G01Q 60/38
See application file for complete search history.

(56) References Cited

U.S. PATENT DOCUMENTS

2021/0190819 A1* 6/2021 Pooser ................ H01S 3/10076
2021/0405503 A1* 12/2021 Pooser .............. G01B 9/02003

* cited by examiner

TRUNCATED NONLINEAR INTERFEROMETER-BASED SENSOR SYSTEM

PRIORITY CLAIM

This application is a continuation of U.S. Ser. No. 17/472,269 which is now U.S. Pat. No. 11,561,453, which is a divisional of U.S. Ser. No. 16/719,437, which is now U.S. Pat. No. 11,119,386, all of which are incorporated herein by reference.

STATEMENT REGARDING FEDERALLY SPONSORED RESEARCH AND DEVELOPMENT

These inventions were made with United States government support under Contract No. DE-AC05-00OR22725 awarded by the United States Department of Energy. The United States government has certain rights in the inventions.

BACKGROUND OF THE DISCLOSURE

Technical Field

This application relates generally to truncated nonlinear interferometer (NLI)-based sensor systems, and more specifically to NLI-based atomic force microscopes (AFMs).

Related Art

An atomic force microscope (AFM) is a high-resolution type of scanning probe microscopy. Typically, AFM imaging relies on an interferometric or optical beam displacement measurement to transduce the movement of a microscopic cantilever as it interacts with a material surface. Like optical beam displacement measurements, current interferometric AFM measurements are limited by the standard quantum limit. Like all signal transduction mechanisms, loss between the signal transduction point and the output of the interferometer at the detector degrades signal to noise ratios.

AFM imaging is limited by a variety of noise sources, including thermal noise, backaction noise, and photon shot noise. Backaction noise often limits the available readout power of AFMs. Further, thermal noise typically exceeds shot noise and backaction noise at ambient temperatures at the cantilever's resonance frequency. AFM measurements are generally performed at the cantilever's resonance frequency because resonant frequency operation improves the signal more than thermal noise increases the noise floor. However, AFM performed at resonance substantially narrows the available bandwidth that can be probed and slows the microscope's measurements because of micromechanical ring down effects.

BRIEF DESCRIPTION OF THE DRAWINGS

The disclosure is better understood with reference to the following drawings and description. The elements in the figures are not necessarily to scale, emphasis instead being placed upon illustrating the principles of the disclosure. Moreover, in the figures, like-referenced numerals designate corresponding parts throughout the different views.

DETAILED DESCRIPTION

Figure 1:
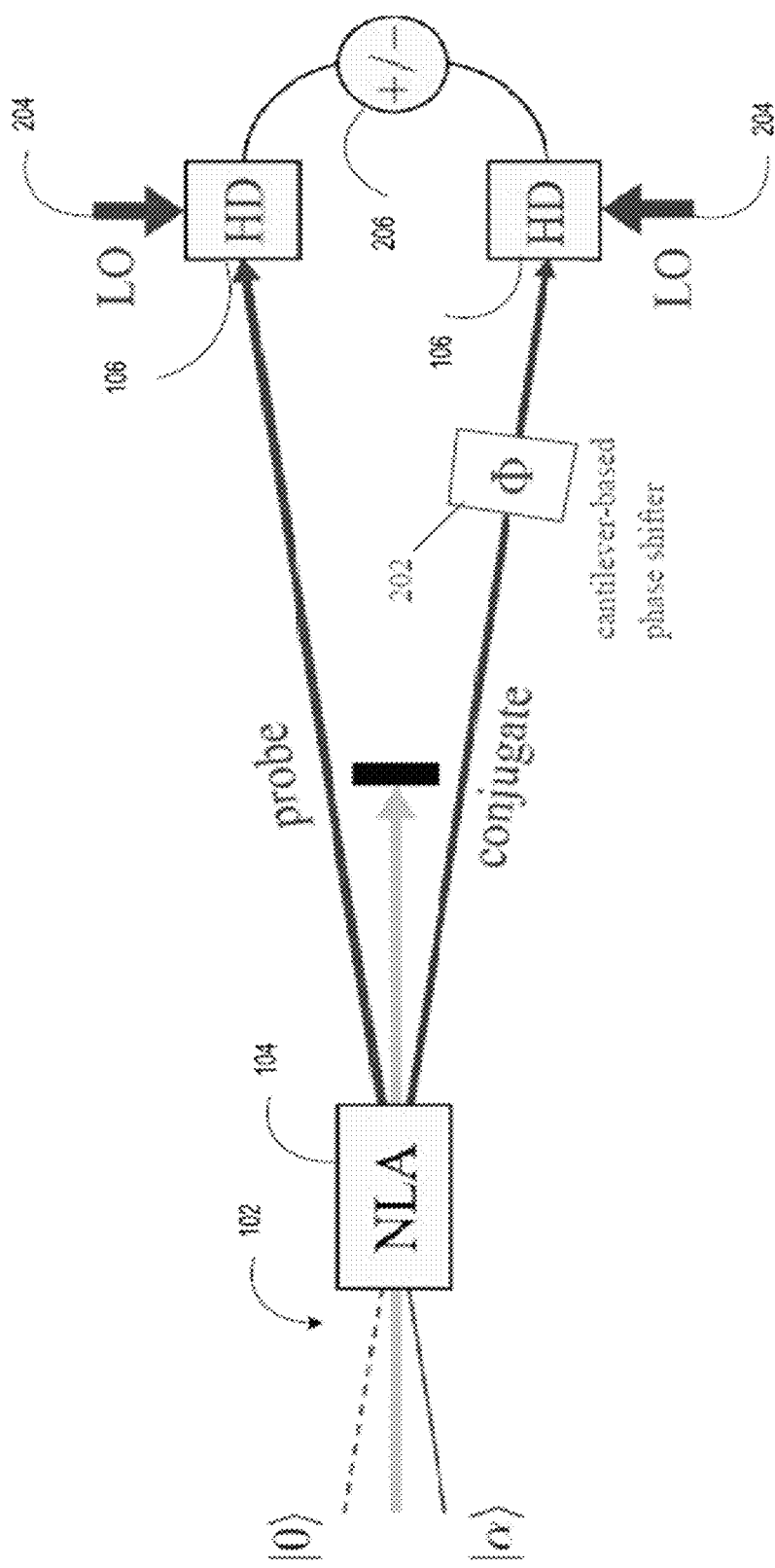
FIG. 1 is a diagrammatic representation of a truncated nonlinear interferometer (NLI) AFM.

Quantum sensors relying on quantum noise reduction in squeezed light have been proposed for use with AFMs because they surpass the sensitivity of known sensors. Such contemporary sensors may operate at an absolute semiclassical limit of noise known as the standard quantum limit, or they may operate above that limit in thermal or systematic noise regimes. The quantum noise reduction in these sensors is highly dependent on optical loss. Further, the challenge in controlling the spatial distribution of quantum correlations has limited the practicality of squeezed-light-enhanced beam displacement measurements.

The disclosed truncated NLI sensor systems outperform linear interferometer-based sensor systems. The sensor systems use phase detection after nonlinear amplification to detect the phase acquired after interacting with a sensor. The sensor systems use non-linear amplification to achieve an enhanced dynamic range, quantum-enhanced phase measurements, and higher signal-to-noise ratios (SNRs). Further, the sensor systems can be arranged to automatically compensate for spatial mode fluctuations or nonuniform spatial modes, while still maintaining high interference visibility, which effectively minimizes the need for spatial control over quantum correlations and drastically improves the sensor system's practicality.

When the sensor is implemented as a microcantilever probe (referred to as a probe), the sensor systems can measure the displacement of the probe with a quantum noise reduction defined by the gain of a nonlinear amplifier (NLA) and the loss of the composite sensor. In initial demonstrations, 3 dB of squeezing corresponds to a quantum-enhanced measurement of beam displacement of about 1.7 fm/√Hz, however the range of quantum noise reduction available when using the described technologies is theoretically limitless with a perfect amplifier and perfect detector according to the physics. In some implementations, the sensor system minimizes photon backaction noise and photon shot noise simultaneously by transducing the probe displacement with a squeezed weak amplitude- or squeezed vacuum-state while using a high-power local oscillator for the phase-sensitive detection. In other implementations, the sensor system may also use the local oscillator to transduce the signal from the probe and the weak squeezed state can be used to obtain lower noise in phase sensitive detection. The local oscillators have the same frequency, spatial mode, etc. as the incoming waves. The disclosed sensor systems enable new approaches to broadband, high speed scanning probe microscopy.

For photon-shot-noise-limited interferometric beam displacement measurements in which a signal is based on the phase acquired by small displacements of an AFM cantilever probe, the minimum cantilever displacement $\Delta z_{SNL}$ is expressed as equation 1 for a wavelength $\lambda$, total power in both arms of the interferometer $P_{tot}$, and a measurement bandwidth $\Delta f$.

$$\Delta z_{SNL} = \frac{1}{2\pi}\sqrt{\frac{hc\lambda\Delta f}{2P_{tot}}} \quad (1)$$

The backaction noise near a micromechanical resonance for a cantilever with a quality factor of Q and a spring constant k may be expressed by equation two, where P is the optical power incident on the cantilever probe.

$$\Delta z_{back} = \frac{2Q}{k}\sqrt{\frac{2Ph\Delta f}{c\lambda}}, \quad (2)$$

For measurements performed off-resonance, Q=1. The standard quantum limit (SQL) may be expressed by the quadrature sum of the photon shot noise limit (the SNL) and the backaction noise limit. In the presence of squeezing, the smallest beam displacement signal provided by interferometric measurements is related to the inverse square root of the power and the squeezing parameter, r as shown in the cantilever displacement measure $\Delta z_{SNL}$ of equation 3.

$$\Delta z_{SNL} = \frac{1}{2\pi e^r}\sqrt{\frac{hc\lambda\Delta f}{2P_{tot}}} \quad (3)$$

For zero squeezing (e.g., the coherent state used as optical read-out of the AFM), r=0, and the AFM recovers the standard minimum resolvable displacement proportional to the inverse square root of the power.

Equation three applies to both absolute displacement measurements and relative displacement measurements. Single mode or multi-mode quantum noise reduction may be used to achieve quantum noise reduction and obtain a factor r>1.

The differential beam displacement noise scales as $\langle \Delta z^2 \rangle \propto 1/(2G-1)$ for a nonlinear gain G in a nonlinear amplifier used to generate two-mode squeezing. Detection of the quadrature difference for two mode squeezed states establishes equation 4, where $\eta$ is the composite detection efficiency, $\theta p$ and $\theta c$ are homodyne phases for the probe and conjugate, and $\varphi$ is the phase shift in the probe arm of an interferometer.

$$\langle \Delta(\hat{X}_-)^2 \rangle = \eta(\sinh 2r \tanh 2r(2\cos(\theta_p + \theta_c - \phi)) + \quad (4)$$
$$\cosh 2r - \tanh^2 2r + \sinh 2r \tanh 2r - 1) + \tanh^2 2r + 1$$

In an ideal case where $\eta=1$ and $\theta p=\theta c=\pi/2$, the measured noise relative to the SNL is described by equation five, which establishes that quantum noise reduction is present for all G that is greater than one. It is also present for all $\eta>0$.

$$\frac{\langle \Delta(\hat{X}_-)^2 \rangle}{SNL} = \frac{1}{2G-1} \quad (5)$$

Further, equation five also holds when the quadratures measured correspond to bright fields and when the phase quadrature corresponds to an optical phase. As a result, equation five describes a quantum enhancement in the SNR when compared to the output of a shot-noise-limited classical interferometer.

In addition, the disclosed truncated NLI AFMs have the same phase sensitivity as a full nonlinear interferometer as expressed in equation six. This sensitivity is the same as an NLI which uses intensity or phase. This is also equivalent to a truncated NLI which uses intensity as the readout.

$$\Delta^2 \phi_{tSU(1,1)} = \frac{2\eta + (1-2\eta)\text{sech}^2(r) - 2\eta\tanh(r)\sin(\phi)}{2\eta|\alpha|^2\sin^2(\phi)} \quad (6)$$

FIG. 1 is a diagrammatic representation of a truncated NLI AFM. The truncated NLI AFM applies phase detectors 106 that detect the phase induced by a sensor in one of the arms of the truncated NLI. In some applications, the phase detectors 106 comprise homodyne detection devices with high power local oscillators (relative to the power of the probe and conjugate beams generated by the NLA). Generally, a local oscillator is a beam of light that is phase locked with an input signal (e.g., the probe beam or the conjugate beam) that is mixed with the input signal in the respective homodyne detection device. The local oscillators act as a defined phase reference that mixes/interferes with the respective probe and conjugate beams.

In FIG. 1, three inputs are received at an input port 102: one input is an optical probe beam of amplitude $\alpha$, one is a beam representing a vacuum state |0>, and the third is a pump laser beam with high power relative to a. The NLA 104 amplifies the probe beam. For every additional photon emitted into the probe beam, a quantum correlated photon is emitted into a second optical field designated the conjugate beam (seeded by the vacuum state that was injected into the NLA). The quantum correlations between the probe and conjugate beams result in a reduced noise and an increased dynamic range for intensity difference and quadrature sum or difference measurements.

The NLA 104 in FIG. 1 can amplify a single spatial mode or it can amplify many spatial modes. Each spatial mode is associated with a different Poynting vector, and each amplified spatial mode shares quantum correlations with the associated spatial mode in the conjugate beam. Therefore, the NLA can generate many pairs of spatial modes between the probe and conjugate beams. Each of these spatial modes exhibits intensity difference and phase sum squeezing.

In the example illustrated in FIG. 1, the conjugate beam interacts with a phase shifter 202 that may induce a phase shift $\Phi$ on the conjugate beam. Since this is a truncated NLI AFM, a cantilever probe is suitably added to, interfaced with, or included in the phase shifter 202. In other implementations, the cantilever-based phase shifter 202 is arranged in the path of the probe beam to interact with, and induce a phase shift on, the probe beam. Unlike conventional AFMs, one arm of the truncated interferometer AFM (e.g., the conjugate beam) need not serve as a phase reference signal for the other (e.g., the probe beam), because the respective local oscillators 204 (shown as LO) serve as the phase reference in each of the respective probe and conjugate beam paths. The local oscillators 204 may be generated by the NLA or derived from a separate laser source that can either be phase-locked to the signal or otherwise has a recoverable phase relationship with the signal that can be reconstructed computationally using data from repeated measurements of the signal-LO phase relationship.

In the example illustrated in FIG. 1, a phase shift Φ induced by the cantilever-based phase shifter 202 on the conjugate beam is extracted through mixing the conjugate beam and the probe beam with the respective local oscillator 204 in their respective beam paths via their respective phase detectors 106 that may comprise homodyne detection/detector devices (HD). After the probe beam and the conjugate beams are processed by homodyne detectors 106, the signals that are output are post processed. The output of each HD is summed and subtracted via an adder and/or a subtractor 206 at a hybrid junction or an output port. Here, the optimum phase shift signal, representative of the phase shift Φ, comprises the sum of the signals rendered from the respective homodyne detection devices. The phase sum measurement exhibits quadrature squeezing that reduces the noise floor below classical limits.

If multiple spatial modes are generated by the NLA, the phase shift induced on those spatial modes can be measured independently or as part of a single-phase measurement in which the image of the multiple spatial modes is interfered with a local oscillator that shares the same spatial modes.

Figure 2:
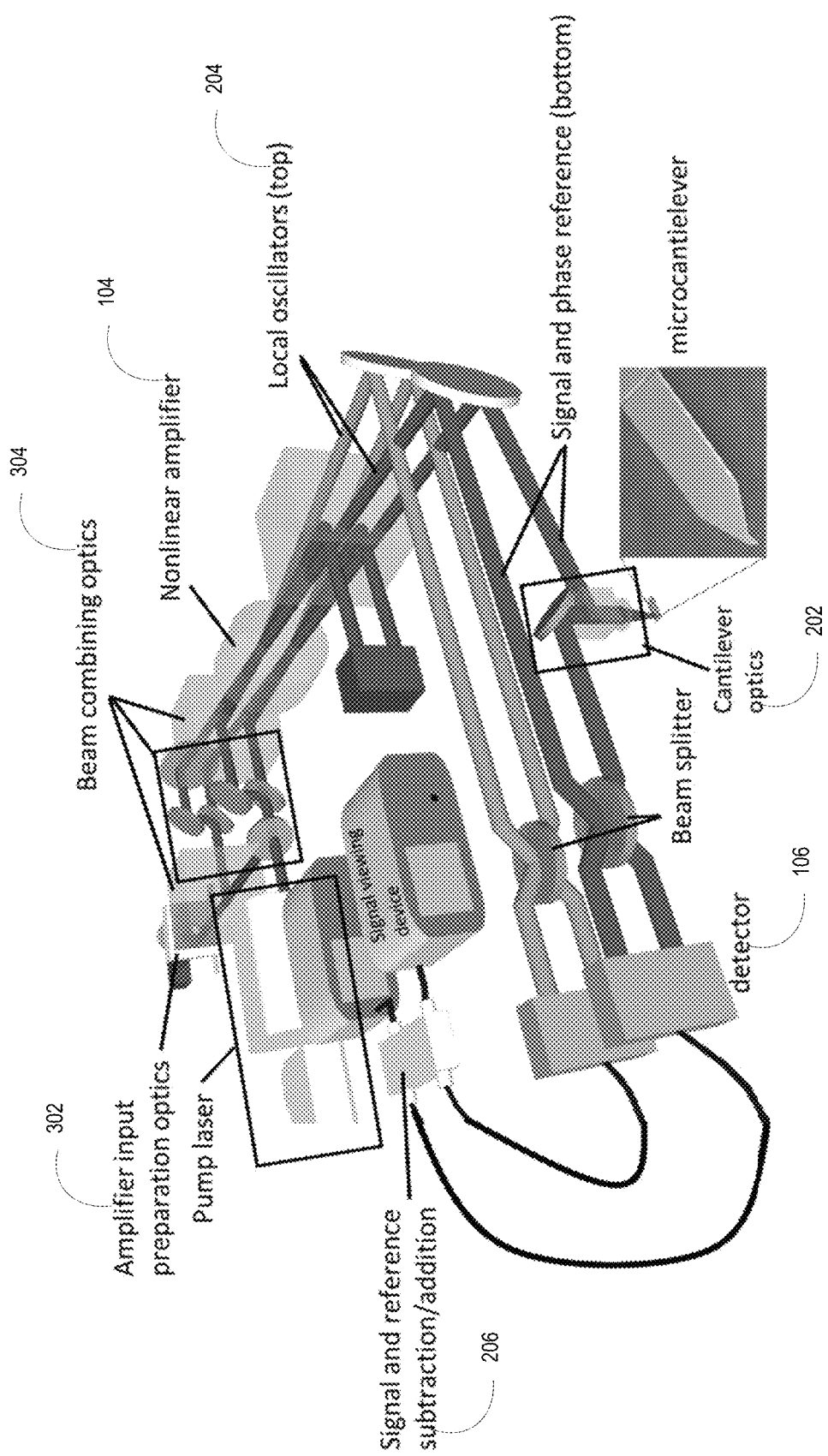
FIG. 2 is an embodiment of a truncated NLI AFM.

FIG. 2 shows an embodiment of a truncated NLI AFM. Here, an acousto-optic modulator (AOM) 302 redshifts a probe from the pump, and a polarizing beam splitter (PBS) combines the cross-polarized pump and probe beams rendered by beam combining optics 304 within a four-wave mixing process in a Rb vapor non-linear amplifier 104. The four-wave mixing process is duplicated with two substantially similar pump beams and two probe beams of varying optical power. The processes (1) generate and amplify probe and conjugate beams that propagate over probe and conjugate paths, and (2) generate high-power local oscillators 204. The probe and conjugate beam signals are well matched because they are derived from the same four-wave mixing process. Either the probe or the probe's LO is reflected from the phase shifter 202 shown as the AFM cantilever before the twin-beam local oscillators 204 are mixed with the probe and conjugate beams on 50/50 beam splitters (BS) in the phase detectors 106 that comprise dual homodyne detection devices in FIG. 2.

The phase measurement based truncated NLI used in FIG. 2 achieves the same SNR and noise reduction as a quantum sensor relying on squeezing in the intensity difference quadrature, with a difference being that the spatial mode dependence is contained in the mode matching between the local oscillator and the probe and conjugate beam signal modes. The truncated NLI AFMs described here boost sensitivity with respect to classical interferometer-based AFMs, are easy-to-build, are reliable as they comprise less parts, and can make use of a naturally-stable squeezed light source, such as a Rb vapor nonlinear amplifier 104. The truncated NLI AFMs have sub shot noise sensitivity. By operating off resonance, they offer faster imaging times for atomic-scale microscopy.

If multiple spatial modes are generated by the NLA, it is possible to readout the displacement of multiple cantilevers in parallel with all of the advantages described above for a single probe and conjugate pair.

In FIG. 2, the local oscillators are produced from the nonlinear amplifier 104. Since the optimal measurement in this system is a relative phase sum measurement, some systems transduce a signal onto both optical fields and measure the phase sum while maintaining quantum noise reduction. If the phase shift is transduced to the local oscillator and the probe beam is used as the phase reference in one use case, some AFM systems operate close to the backaction limit. In another use case, when the signal field rendered by the nonlinear amplifier 104 comprises the probe signal that contains the phase objects, and the input to the nonlinear amplifier 104 is a small probe field, the backaction is reduced commensurate with the lower intensity, but the phase signal rendered by the systems is effectively the same due to scaling with the total power of both LOs, the probe and the conjugate.

Figure 3:
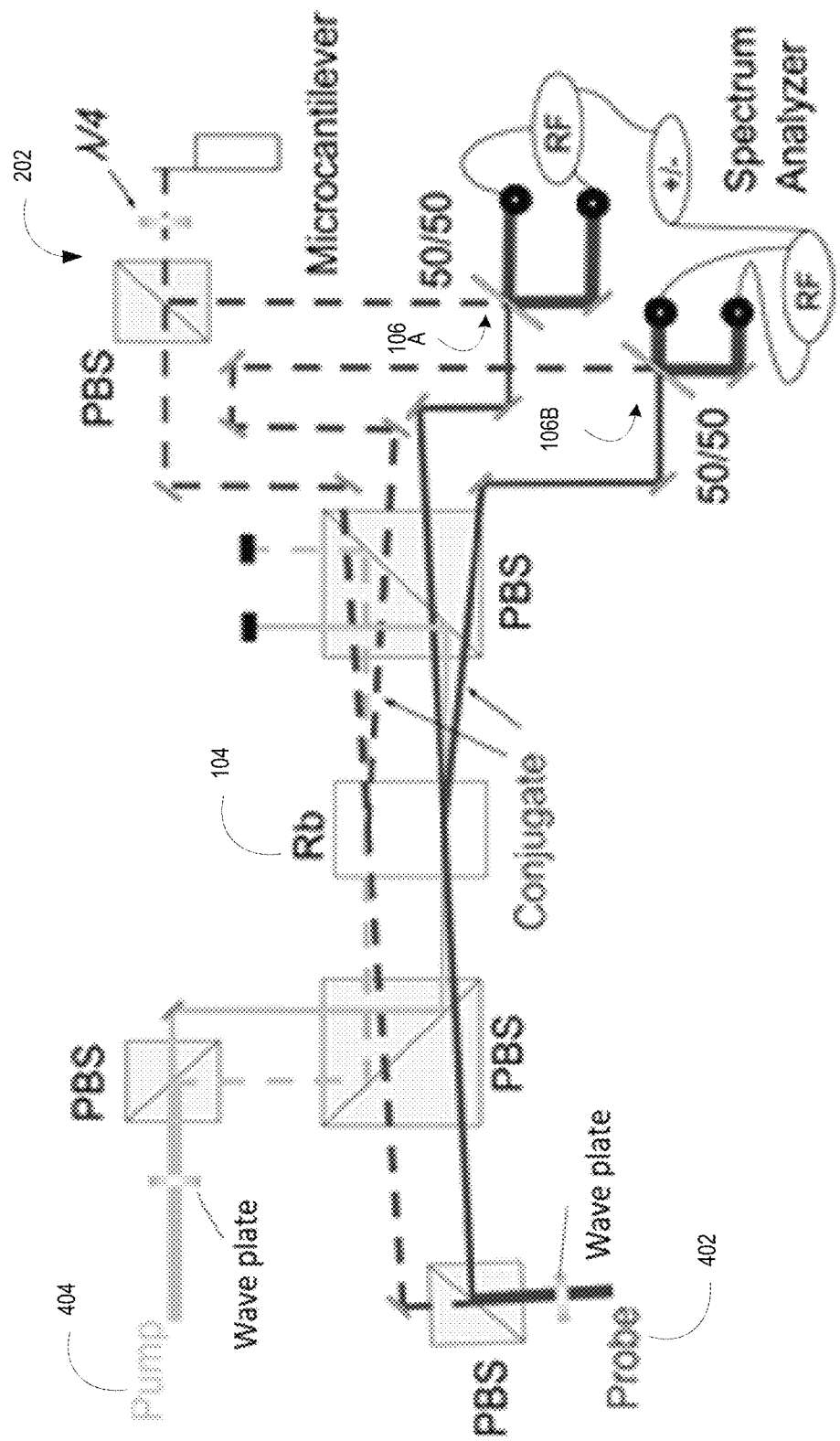
FIG. 3 is another embodiment of a truncated NLI AFM.

FIG. 3 shows another embodiment of a truncated NLI AFM. This truncated NLI AFM executes a unique multiplexing of the nonlinear amplifier 104 to generate a second set of amplified beams with identical optical modes to the signals. It is a truncated NLI AFM in which two very similar four-way mixing processes are occurring. One processes relatively high-powered signals often associated with the local oscillators 204, and the second processes relatively lower powered signals often associated with the probe beam and the conjugate beam. Because the cantilever-based phase shifter 202 used by the truncated NLI AFM illustrated in FIG. 3 are susceptible to backaction noise that may be amplified by high powered signals, the lowered power signals are routed to the cantilever-based phase shifter 202. In other embodiments, the phase shifter 202 that comprises a polarizing beam splitter (PBS), a quarter wave plate (24), and a microcantilever in FIG. 3 is suitably used in both local oscillator paths.

Because light imparts radiation pressure on any sensor, any light that interacts with a cantilever that may serve as a phase shifter 202 pushes on it slightly, altering its trajectory. The disruptive kicks are referred to as "backaction" that affects the resulting measurement.

In the example illustrated in FIG. 3, there are two inputs to the input port. One input is the coherent light 402 (shown as the probe signal) that is pre-processed by a wave plate and two PBSs. The second is a strong pump beam 404 that is used as a resource to amplify the probe and the local oscillator.

In the example illustrated in FIG. 3, only one phase shifter 202, that comprises a polarizing beam splitter (PBS), a quarter wave plate (24), and a microcantilever is used. The dashed line incident on the phase shifter 202 represents either the probe or the probe's local oscillator. It could equivalently represent the conjugate or the conjugate's local oscillator. In other implementations of the truncated NLI AFM, dual phase shifters 202 are used (e.g., one in each local oscillator path or one in both the probe and conjugate path, not shown). In the system of FIG. 3, phase detection devices 106A and 106B are implemented through homodyne detection devices.

At the homodyne detection devices 106A, 106B, the phase difference between the two beams (e.g., the probe beam signal and the first local oscillator and the conjugate beam signal and the second local oscillator) result in a change in the intensity of the light on the respective homodyne detectors 106A, 106B. The resulting intensity of the light after mixing of the respective two beams are measured. Squeezing is present in the rf sidebands of the differenced and summed signals generated by the dual homodyne detectors 106A, 106B.

To demonstrate the reduction in noise and the improvement in phase sensitivity of the truncated NLI AFM illustrated in FIG. 2 or 3, an acousto-optic modulator (AOM) was used to redshift a probe 3.042 GHz from the pump, and a PBS combined the cross-polarized pump and probe beams within the Rb vapor non-linear amplifier 104, resulting in intensity difference squeezing of up to about 5 dB relative to the SNL when measured directly after the non-linear amplifier 104. In the examples illustrated in FIGS. 2-3, dual homodyne interferometry was used in lieu of intensity difference measurements to realize more practical quantum-enhanced beam displacement measurements. After the non-linear amplifier 104, the power of the squeezed probe and conjugate fields were about 1.5 µW and 1.4 µW, respectively, and the power of the probe and conjugate local oscillators were 107 µW and 72 µW, respectively. A proportional-integral controller phase-locked the measurement at the dual homodyne interference fringes. An optional spectrum analyzer was set at about a 10 kHz resolution bandwidth, about 30 Hz video bandwidth, at about 0.5 s sweep time, at about 20 averages.

AFM beam displacement measurements were performed using the truncated NLI AFM illustrated in FIG. 2 or 3 with either the probe or the probe's local oscillators reflected from a gold-coated AFM microcantilever 202 with a fundamental resonance of about 13 kHz and a force constant of about 0.2 N/m in a Bruker piezo-actuated AFM mount driven at about 737 kHz. Notably, using either the probe or the probe's local oscillator to transduce the microcantilever motion results in qualitatively similar responses despite fundamentally different operating regimes. When the probe is reflected from the cantilever probe 202, the approximate 5% loss on the cantilever 202 results in about a 0.2 dB reduction in squeezing. In contrast, when the probe's local oscillator is reflected from the cantilever 202, the reduction in quadrature squeezing occurs as a result of reduced mode matching, and that reduction can be minimized by passing the probe through the same optical train, with the cantilever 202 replaced by a macroscopic mirror, as shown by graphed phase sum signals shown in FIG. 4. Using the probe rather than the probe's local oscillator to transduce the cantilever response virtually eliminates or minimizes backaction noise from the measurement, whereas a high-power local oscillator will induce backaction noise if it were used to transduce the cantilever response.

Figure 4:
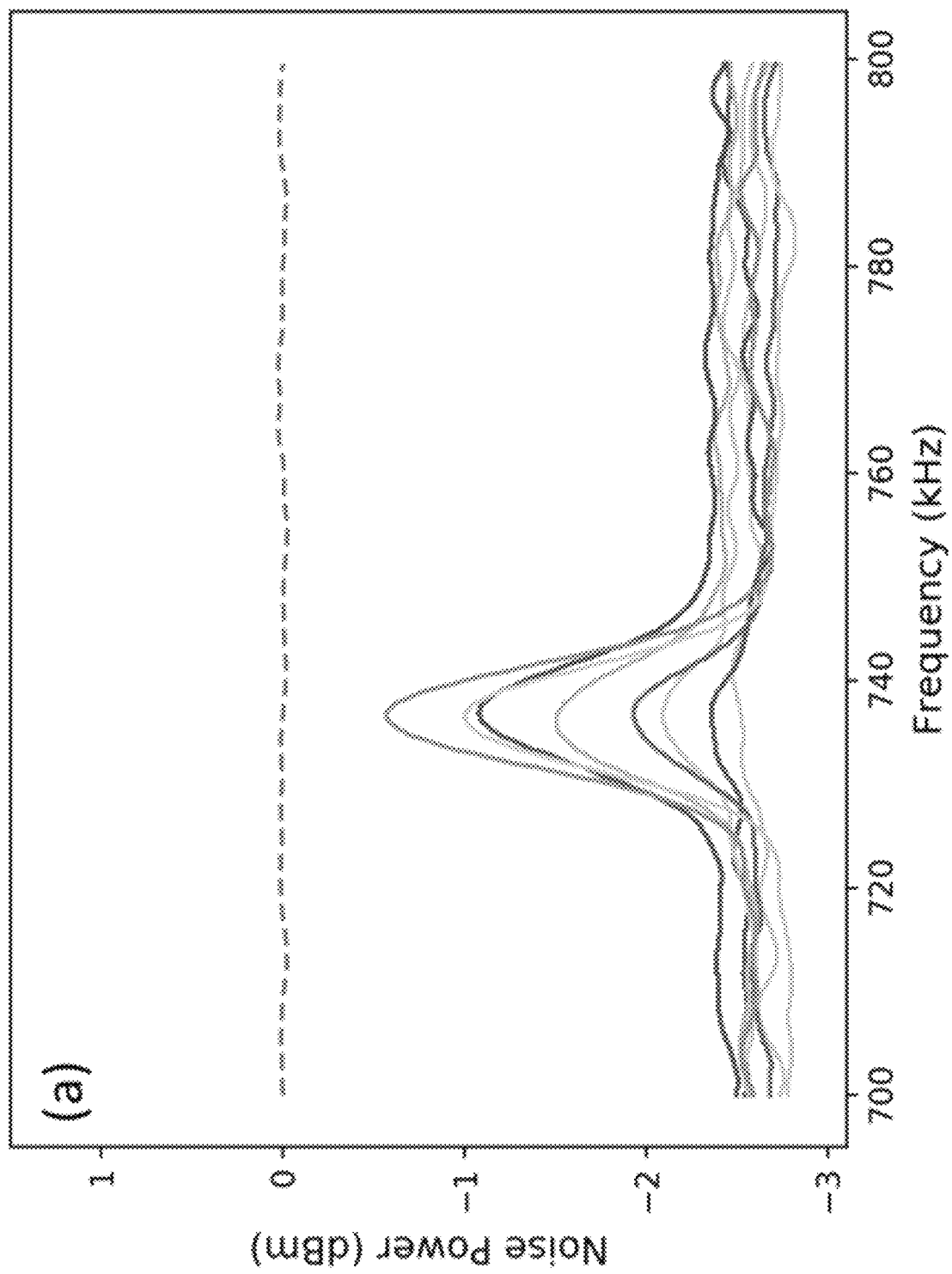
FIG. 4 illustrates spectrum analyzer traces of a microcantilever displacement normalized to a photon shot noise limit (SNL) when a weak probe signal is reflected from a microcantilever before truncated NLI detection.
Figure 5:
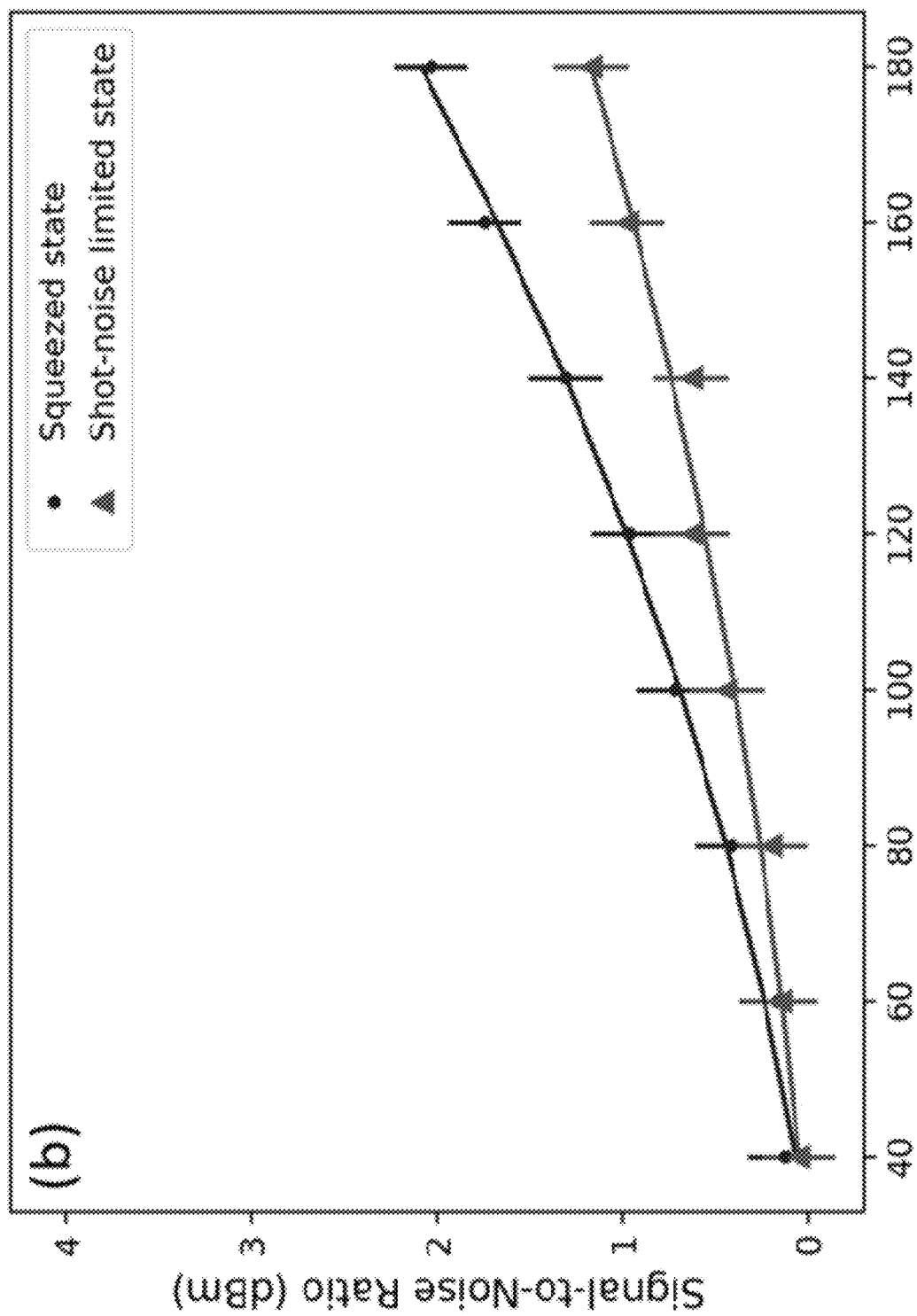
FIG. 5 is the signal to noise ratio (SNR) associated with FIG. 4.

FIG. 4 illustrates the measured phase sum signal from the dual homodyne measurement when the weak squeezed state is reflected from the AFM cantilever 202 and a piezo actuator is driven at about 40 mV to about 180 mV. FIG. 5 illustrates the measured signal to noise ratio for each signal in FIG. 4 along with the corresponding signal to noise ratios for shot-noise limited measurements. The measured phase-sum squeezing varied from about 2.6-2.8 dB below the SNL.

Figure 6:
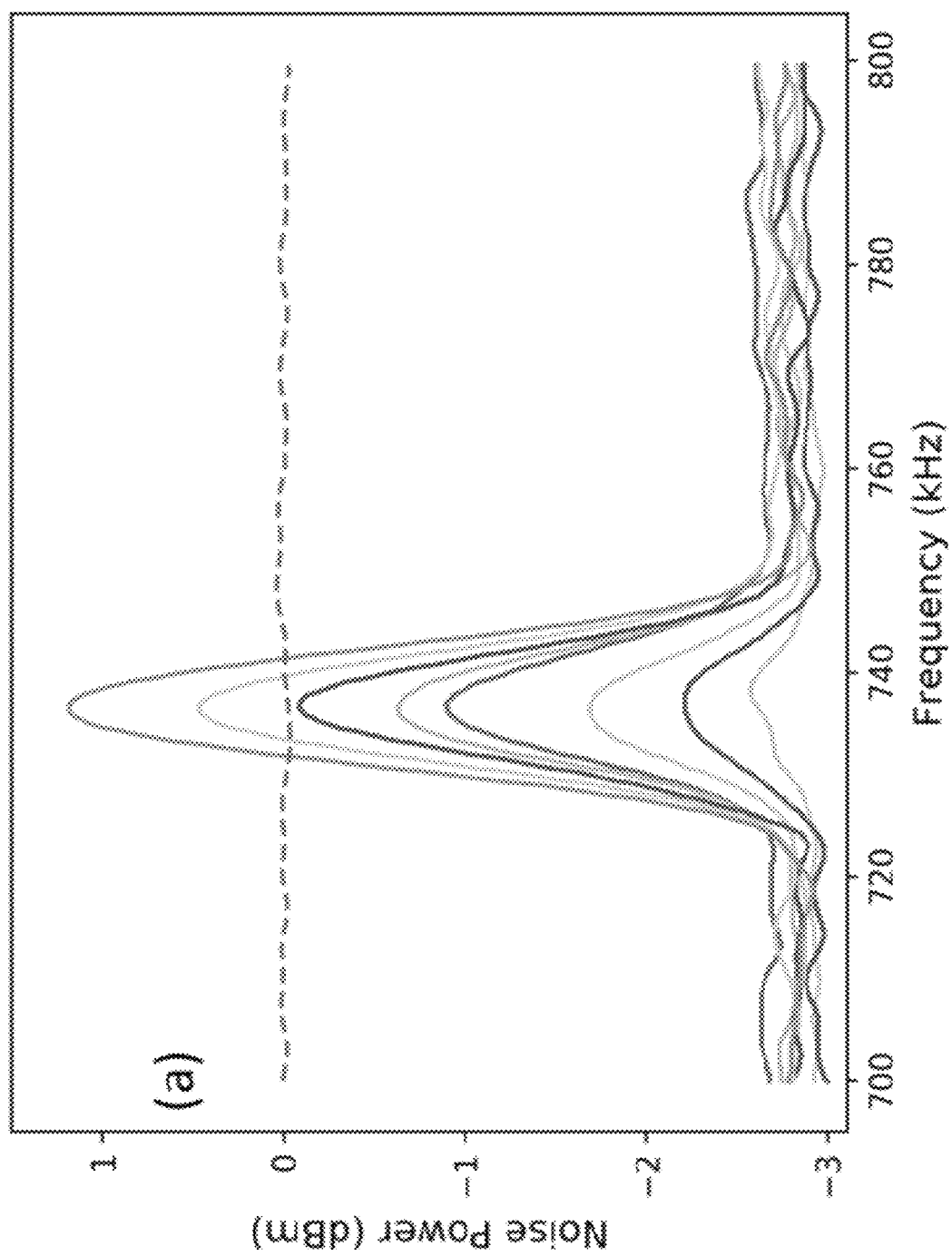
FIG. 6 shows spectrum analyzer traces of microcantilever displacement normalized to SNL when a local oscillator is reflected from the microcantilever before truncated NLI detection.
Figure 7:
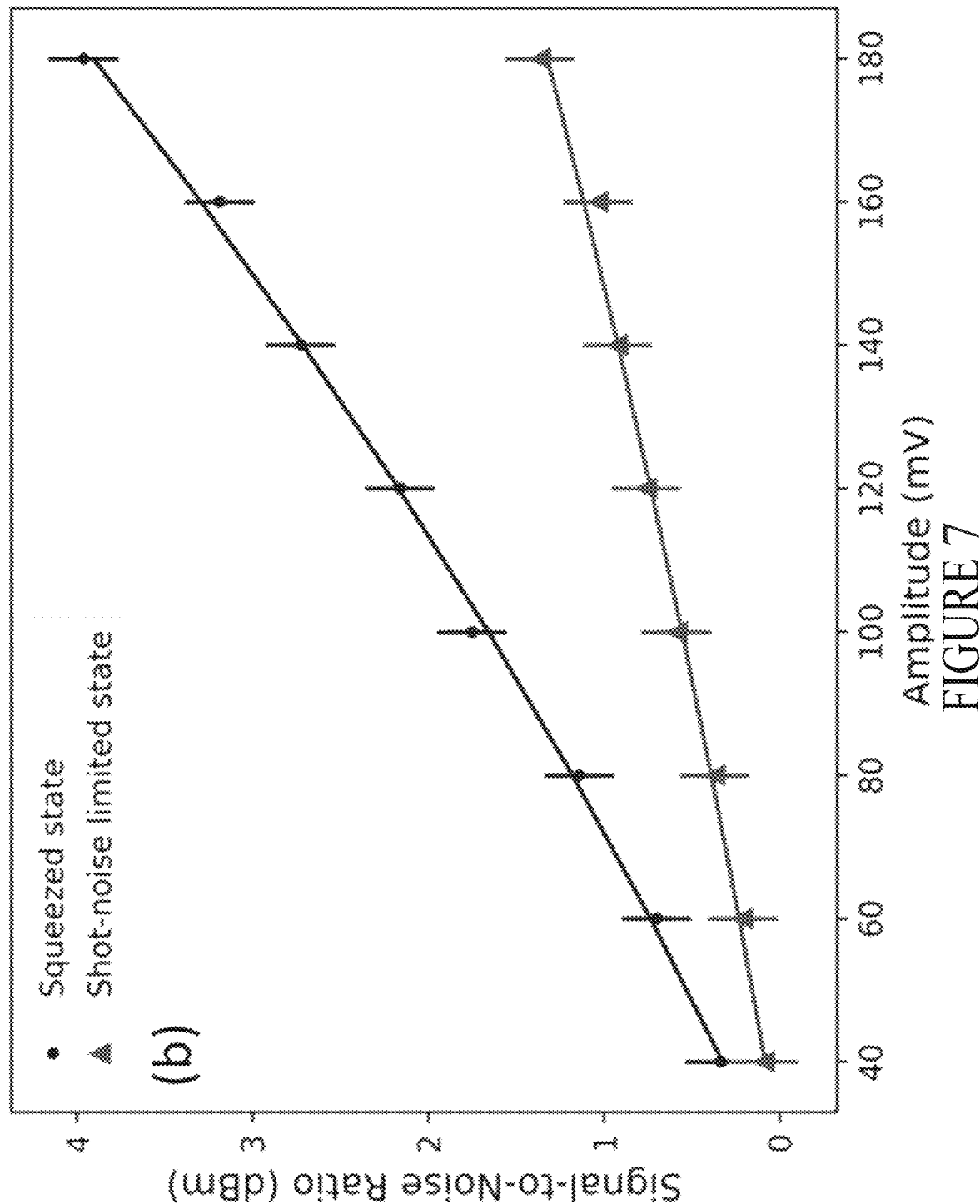
FIG. 7 is the SNR associated with FIG. 6.

FIGS. 6 and 7 illustrate the measured phase sum signal and SNR respectively when the local oscillator is reflected from the AFM cantilever 202 instead of the weak squeezed state. All other experimental parameters remain the same. For the use case parameters described herein, the measurement was shot noise limited, with the photon SNL given by 3.3 fm/√Hz.

The example of truncated NLI AFM illustrated in FIG. 2 or 3 was limited to a low gain regime by the available pump power and by Doppler broadening in the Rb vapor non-linear amplifier 104, but the local oscillator power may be increased by two orders of magnitude by increasing the seed probe power, the pump power, and the Rb vapor non-linear amplifier 104 temperature without detrimentally effecting the phase detection that may occur through dual homodyne detection. The measured phase-sum squeezing of up to about 3 dB shown in FIG. 5 or 7 was also limited by operation in the low gain regime but squeezing in excess of about 10 dB may occur with this squeezed light source. The AFM techniques described herein do not rely on this squeezed light source but could utilize any nonlinear amplifier together with phase sensitive detection. Therefore, the disclosed techniques for constructing an AFM with enhanced signal to noise via quantum noise reduction provided by a truncated NLI does not rely on any particular NLA device, and it may be built from any NLA device that can provide quantum noise reduction or increased dynamic range. Therefore, the AFM techniques have no theoretical limit to the signal enhancement or local oscillator or signal powers that may be used or achieved, and the numbers 3 dB and 10 dB above are provided only to illustrate the technology, they are nonlimiting particulars of a representative prototype.

Compared with past quantum beam displacement experiments, an optimized truncated nonlinear interferometric AFM enables substantially more accessible quantum-enhanced atomic force microscopy suitable for broadband characterization of high-speed dynamics in materials. An AFM such as the disclosed NLI AFMs in an embodiment with significantly reduced loss and improved squeezing will attain a signal to noise equivalent to that of an AFM operating on a cantilever micromechanical resonance frequency, but the disclosed NLI AFMs may operate with the same or better signal to noise at a broad bandwidth of signal frequencies inaccessible to a conventional interferometric AFM. For example: unlike other quantum sensors, only 5% optical loss is introduced by the disclosed NLI AFMs, and the loss may be substantially further reduced by improving the reflective coating on the AFM cantilever. By optimizing the local oscillator power, the available squeezing, and the optical loss, the systems obtain greater than two orders of magnitude further improvement in SNR compared with the measurements rendered by conventional interferometric AFMs. Such an enhancement in sensitivity is comparable to the enhancement provided by operating an AFM at the micromechanical resonance frequency.

Figure 8:
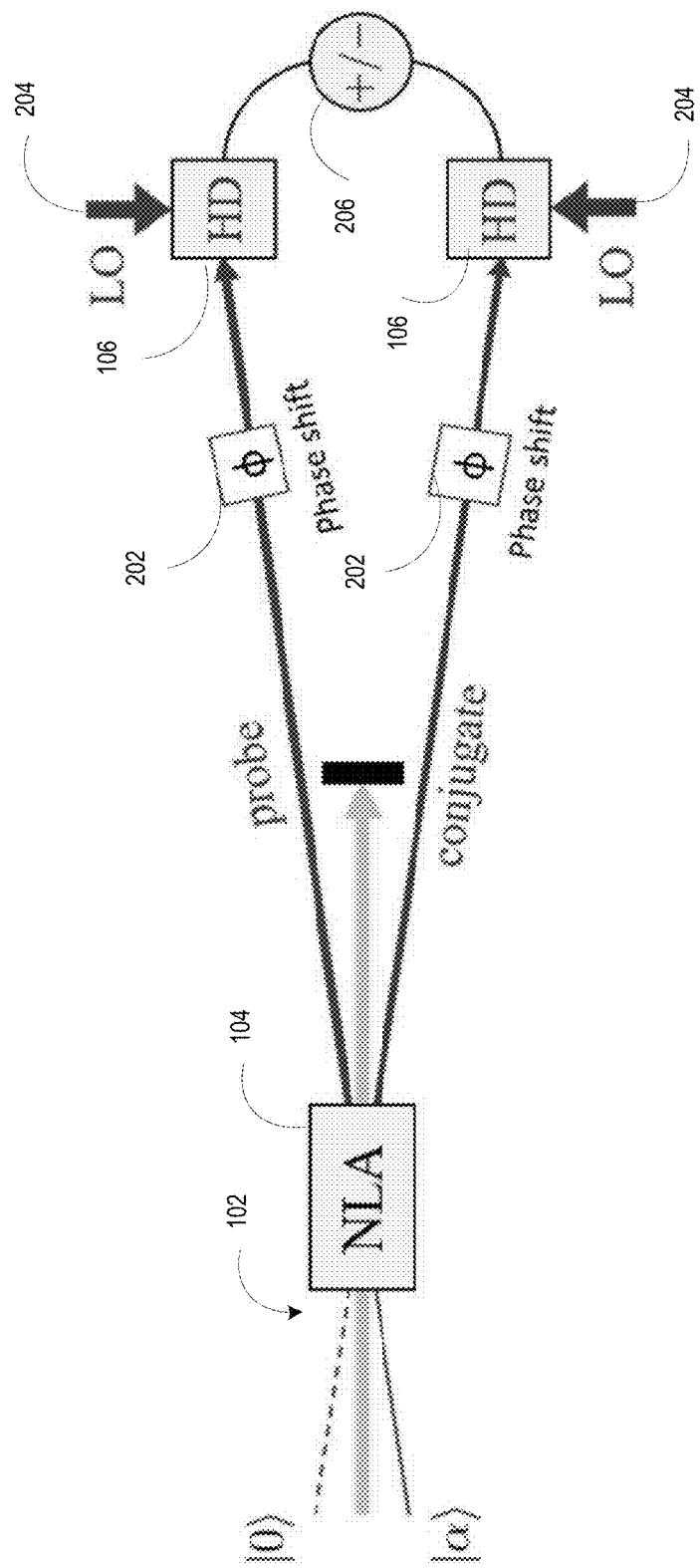
FIG. 8 is a truncated NLI-based sensor system incorporating the same phase shift (which can be induced by a sensor of many types) into both arms of the truncated NLI. The arms of the NLI may be collinear and receive the same phase shift depending on the application and the signal being detected and the optimization of the SNR.

Another embodiment of a truncated NLI sensor system is described in connection with FIG. 8. FIG. 8 shows a truncated NLI sensor system in which both the probe beam and the conjugate beam interact with phase shifters 202 that induce the same phase shift on the probe beam and the conjugate beam. While shown in FIG. 8 as separate phase shifters 202 disposed in each beam path, the phase shift @ induced in the probe beam and the conjugate beam can also be induced by a common and/or unitary phase shifter. In FIG. 8, both the probe and conjugate beams contain the same phase shift @ that is extracted through mixing with the respective local oscillators 204 in their respective beam paths via their respective phase detectors 106 that may comprise homodyne detection/detector devices (HD). After the probe beam and the conjugate beams are processed by homodyne detections, the output of each HD is summed and subtracted via an adder and/or a subtractor 206. Here, the optimum phase shift signal comprises the sum of the signals rendered from the respective homodyne detection devices. The phase sum measurement exhibits quadrature squeezing that reduces the noise floor below classical limits, while summing allows for twice the signal that would be measured when the phase shift Φ is induced in only one arm of the interferometer, since the signal is in both the probe beam and the conjugate beam. The phase shift detection in both the probe beam and conjugate beams (e.g., arms) allows the truncated NLI sensor system illustrated in FIG. 8 to transduce a phase signal from both the probe beam and the conjugate beam from the same physical phenomenon. This condition does not occur in linear interferometers. As shown in FIG. 8, the phase shift Φ is induced in both the probe beam and the conjugate beam, so corresponding phase shift signals are extracted and summed. In a conventional linear interferometer, the two signals phase shift would cancel. More generally, the two phase shifters may each induce independent phases, and the system may be used to detect the sum of the phase shifts. When the probe and conjugate share the same optical path, the homodyne detection apparatus may be reduced to a single homodyne detection that uses local oscillators with common paths for interference with the probe and conjugate path. A balanced HD may be spatially, frequency, or temporally multiplexed in this way to reduce detection system overhead.

When the common and/or unitary phase shifter 202 of the truncated NLI sensor system illustrated in FIG. 8 is implemented as a microcantilever probe, the resulting NLI AFM will have twice the dynamic range of the NLI AFM illustrated in FIG. 1, 2, or 3. However, the common and/or unitary phase shifter 202 of the truncated NLI sensor system illustrated in FIG. 8 can be implemented as any one of a plasmonic or metamaterial sensor, a magnetometer, or an imaging sensor.

Figure 9:
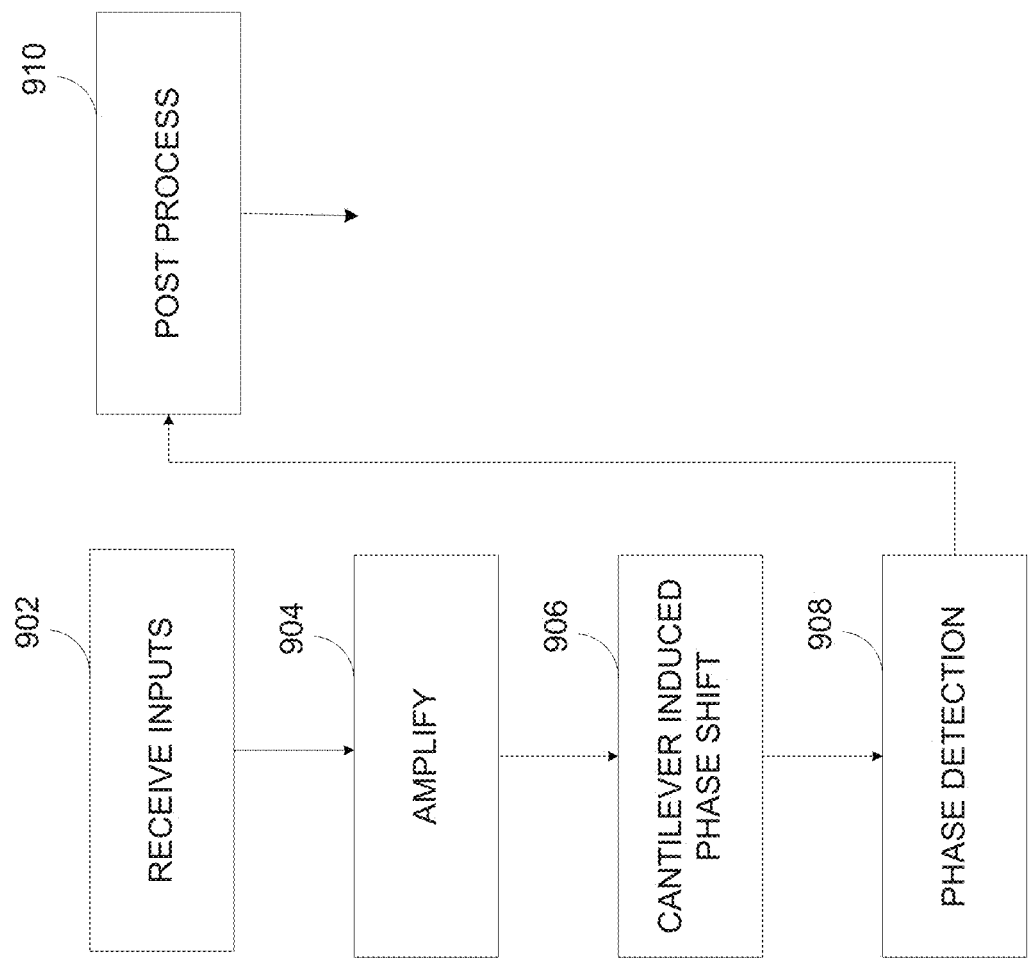
FIG. 9 is a process that optimizes phase sensing in a truncated NLI AFM.

FIG. 9 is a flowchart of a process that optimizes phase sensing in any one of the embodiments of the truncated NLI AFMs described above in connection with FIGS. 1-3 and 8. At 902, a non-linear amplifier 104 receives three inputs, a strong pump beam, a weak probe beam, and a vacuum state. At 904, two mode squeezing beams, along with a pair of higher power local oscillators, is generated in the NLA.

Here, either or both of the probe beam path and the conjugate beam path may contain the cantilever-based phase shift media 202. At 906, the cantilever-based phase shift media 202 may induce a phase shift on the probe beam and/or the conjugate beam. Unlike conventional processes, the conjugate beam need not serve as a reference phase signal for the probe beam, because the respective local oscillators serve as the phase reference for the respective probe and conjugate beam signals. Instead the conjugate serves as a noise reference.

At 908, the phase shift induced by the cantilever-based phase shift media 202 in either one or both of the probe beam and the conjugate beam is extracted by their combinations with the local oscillators in their respective beam paths via their respective phase detectors 106 that may occur through homodyne detection processes. At 910, after the probe beam and the conjugate beam are processed by their homodyne processes, the phase shift signal outputs are post processed such as by a sum and/or subtraction process. The optimum phase shift signal comprises the sum of the phase shift signals rendered from the respective phase detection processes (e.g., the homodyne detection processes). When the phase shift is present in both the probe beam and the conjugate beam, the sum doubles the signal compared with measurements in which the phase is transduced by only one arm. Such an approach is impossible with conventional interferometry because same the phase on each arm would result in no fringe shift and thus no signal. The squeezing generated by the NLA allows for improvement in SNR (for example, up to an additional order of magnitude in one embodiment in which 10 dB of squeezing is available) compared with conventional linear interferometers. A cantilever probe 202 may induce the phase shift or cause the phase shift to create an AFM process with an extended dynamic range.

In the absence of squeezing, i.e. when excess noise is present in a sensor, the advantages described above, e.g., improved dynamic range enabled by a high power LO and the ability to transduce the sensor response onto both arms of the interferometer, remain advantages of the system.

In alternate processes, phase is induced, at 906 by the cantilever-based phase shift media 202, on the local oscillators and measured with respect to the respective probe beam and conjugate beam they are mixed with. The process thereafter, e.g., operations 908, 910, functions the same to measure the relative change in phase.

For lossy sensors, e.g. plasmonic biosensors, this alternate process would cause no loss in squeezing because the squeezed state never interacts with the lossy element. While the signal would obtain loss, the loss would be the same as in a conventional interferometer, while the undegraded squeezing present in the probe and conjugate beams would still increase the SNR relative to the conventional case.

Figure 10:
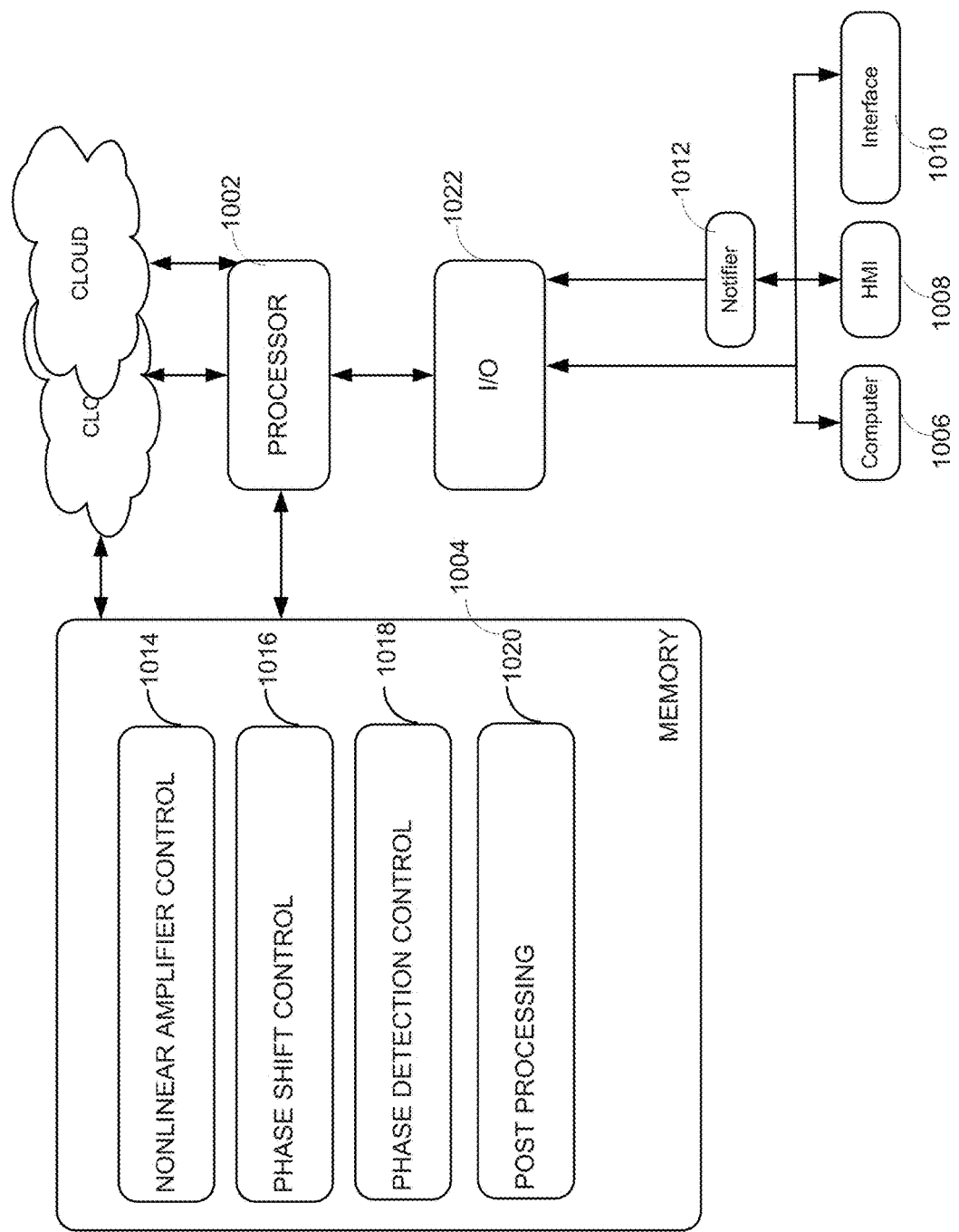
FIG. 10 is a diagram of an example of a computing system for controlling truncated NLI-based sensor systems like the ones described in FIGS. 1-3 and FIG. 8.

FIG. 10 is a block diagram of a fully automated system that executes the process flows and characteristics described above and those shown in FIGS. 1-9 to optimize phase sensing and/or measurement. The optimization may occur with proportional-integrative-differential gain feedback controllers, interfacing with or in place of or replaced by software-based optimization methods, such as optimization methods based on machine learning or artificial intelligence used to optimize the phase measurement set point or other aspects of the system which optimize SNR. The optimization system may consist of, e.g., autoencoders, deep neural nets. The system comprises a processor 1002, a non-transitory computer readable medium such as a memory 1004 (the contents of which are accessible to the processors 1002), and an input/output interface 1022 (I/O). The I/O 1022 connects devices and local and/or remote applications such as, for example, additional local and/or remote inputs and/or outputs. The I/O 1022 may interface with one or more local and/or remote computers 1006, local and/or remote human-machine interface (HMIs), and/or other interfaces 1010, and/or a notifier 1012 (e.g., program used as a "hub" for collecting and rendering alarms to remote devices or users). The hub provides a common connection to some or all of the devices in the systems The memory 1004 stores instructions in a non-transitory media, which when executed by the processor 1002, causes the AFM and some or all of the functionality associated with sensing phase, for example. The memory 1004 stores software instructions, which when executed by the processor 1002, causes the phase sensing, and/or a control system to render functionality and/or control associated with a non-linear amplifier 1014, phase shifting 1016, phase detections 1018, and the post processing 1020 such as adding and/or subtraction of the phase shift signal outputs, for example. In the systems described herein, cloud storage may provide ubiquitous access to some or all of the system's resources and higher-level services that can be rapidly provisioned over a distributed network. Cloud storage allows for the sharing of resources to achieve consistent services across many monitored devices at many local and remote locations and provides economies of scale.

The memory 1004 and/or storage disclosed may retain an ordered listing of executable instructions for implementing the functions described above in a non-transitory computer code. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (an erasable programmable red-only memory or EPROM or Flash memory), or a database management system. The memory 1004 may comprise a single device or multiple devices that may be disposed on one or more dedicated memory devices or disposed on a processor or other similar device. An "engine" comprises a hardware processor or a portion of a program executed by a processor that executes or supports each of the phase sensing and/or control functions associated with the devices and/or processes described herein. When functions, steps, etc. are said to be "responsive to" or occur "in response to" another function or step, etc., the functions or steps necessarily occur as a result of another function or step, etc. It is not sufficient that a function or act merely follow or occur subsequent to another. The term "substantially" or "about" encompasses a range that is largely (anywhere a range within or a discrete number within a range of ninety-five percent and one-hundred and five percent), but not necessarily wholly, that which is specified. It encompasses all but an insignificant amount.

While each of the systems and methods shown and described herein operate automatically and operate independently, they also may be encompassed within other systems and methods including any number of iterations of some or all of the process used to sense phase differences through a truncated NLI, for example. Alternate systems may include any combination of structure and functions described or shown in one or more of FIGS. 1-9. These systems are formed from any combination of structures and functions described. The structures and functions may process the same, additional, or different input and may include other devices and distributed sources to provide real time or near real time phase detections. Alternate systems illustratively disclosed herein may be practiced in the absence of any element and functionality which is not specifically disclosed herein. In some alternate systems, when elements and/or functions are not disclosed herein, those alternate systems are devoid of or operate in the absence of those non-disclosed elements and/or functions. In yet other alternate systems, the disclosed devices and functions are recited individually, rather than as an inseparable whole. In these alternate systems, one or more but not all of the recited elements and all of the recited functions disclosed herein may be completely lacking, devoid, or may be excluded from some alternate systems. For example, some disclosed systems operate with only a single non-linear amplifier. These systems operate in the absence of more than one non-linear amplifier and alternatively in the absence of a non-linear amplifier that processes other signals too.

The disclosed NLI AFMs outperform conventional linear interferometer-based AFMs. The disclosed NLI AFMs use of a non-linear amplifier achieves an enhanced dynamic range, quantum-enhanced phase measurements, and higher signal-to-noise ratios. In view of the above, the disclosed NLI AFMs drastically improve the practicality of quantum enhanced beam displacement measurements.

The disclosed NLI AFMs measure the phase induced by microcantilevers with quantum noise reduction limited only by the gain of the NLA and the loss of the homodyne detection. The disclosed NLI AFMs minimize photon back-action noise and achieve a quantum noise reduction by transducing the cantilever displacement signals with a weak squeezed state while using processes that detect optical waves through local oscillators having the same frequency, spatial mode, etc. as the incoming waves. By combining quantum noise reduction, improved SNR through large LO powers, and dual phase measurements, the disclosed systems enable new approaches to broadband, high speed scanning probe microscopy in which resonant operation is possible, but not required.

The technologies described herein can be implemented in accordance with the following aspects.

1. In one aspect, a truncated non-linear interferometer-based atomic force microscope (AFM) comprises:
    an input port to which an optical beam is received;
    a non-linear amplifier that amplifies the optical beam with a pump beam and that renders a probe beam and a conjugate beam;
    local oscillators having a measurable relationship with the probe beam and the conjugate beam;
    a cantilever, wherein a displacement of the cantilever is transduced by the probe beam or the conjugate beam or their respective local oscillators as a change in phase of a relevant optical beam;
    one or more phase-sensitive detectors configured to
        detect a phase modulation between the respective local oscillators and the probe beam and the conjugate beam, the detected phase modulation corresponding to the change in phase, and
        output one or more phase signals based on the detected phase modulation; and measurement circuitry configured to measure a combination of the phase signals that is indicative of the cantilever displacement, the combination being one of a sum or difference of the phase signals, the measured combination being one or more signals that exhibit quantum noise reduction in either an intensity difference or phase sum or amplitude difference quadrature, respectively.
2. The AFM of aspect 1, where the local oscillators have a measurable relationship with the optical beam.
3. The AFM of aspect 2 where the local oscillators are phase locked with the optical beam.
4. The AFM of aspect 1 where a phase difference between the local oscillators and the probe beam and the conjugate beam is measurable.
5. The AFM of aspect 4, where the local oscillators are phase locked to the probe and conjugate beams.
6. The AFM of any one of aspects 1-5 where the cantilever induces a phase shift in the probe beam and the conjugate beam.
7. The AFM of any one of aspects 1-5 where the cantilever induces a phase shift in one of the local oscillators.
8. The AFM of aspect 1, comprises
    a plurality of cantilevers,
    where the non-linear amplifier renders multiple spatial modes of the probe beam and the conjugate beam.
9. The AFM of aspect 8, where the multiple cantilevers are disposed in beam paths of the multiple spatial modes of the probe beam, respectively, and induce phase shifts in the multiple spatial modes of the probe beam.
10. The AFM of aspect 8, where the multiple cantilevers are disposed in beam paths of the conjugate-beam spatial modes, respectively, and induce phase shifts in the conjugate-beam spatial modes.

11. The AFM of aspect 8, where
    the non-linear amplifier renders multiple spatial modes of the local oscillators, and
    the multiple cantilevers are disposed in beam paths of the local-oscillator spatial modes, respectively, and induce phase shifts in the local-oscillator spatial modes.
12. The AFM of any one of the preceding aspects where the local oscillators serve as phase references for the one or more detectors.
13. The AFM of any one of the preceding aspects where the one or more detectors comprise homodyne detection devices.
14. The AFM of any one of the preceding aspects where the pump beam comprises a laser beam.
15. In another aspect, a method of operating a truncated non-linear interferometer-based atomic force microscope (AFM) comprises:
    coupling an optical beam to a non-linear amplifier so as to amplify the optical beam with a pump beam that renders a probe beam and a conjugate beam;
    generating two local oscillators that have a measurable relationship with the probe beam and the conjugate beam are phase locked to the probe and conjugate beams;
    inducing a phase shift in the probe beam or the conjugate beam or their associated local oscillators by coupling the relevant optical beam to a cantilever, wherein a displacement of the cantilever is transduced by the relevant optical beam into the phase shift;
    detecting, by one or more phase-sensitive detectors, a phase modulation between the respective local oscillators and the probe beam or the conjugate beam, wherein the detected phase modulation corresponds to the phase shift and is output as one or more phase signals; and
    measuring one or both of a sum and difference of the phase signals, resulting in one or more signals that exhibit quantum noise reduction in either an intensity difference or phase sum or amplitude difference quadrature, respectively.
16. The method of aspect 15 where an intensity of phase modulation represents a phase difference between the one of the local oscillators and the probe beam or the conjugate beam.
17. The method of aspect 15 or 16 comprising coupling the cantilever to the non-linear amplifier to induce the phase shift in the probe beam or the conjugate beam.
18. The method of aspect 15 comprising coupling the cantilever to the non-linear amplifier to induce the phase shift in one of the local oscillators.
19. The method of aspect 15 or 16 comprising coupling the cantilever to the non-linear amplifier to induce the phase shift in both the probe beam and the conjugate beam.
20. The method of aspect 15 comprising coupling the cantilever to the non-linear amplifier to induce the phase shift in both local oscillators.
21. The method of any one of aspects 15-20 comprising coupling homodyne detection devices to the non-linear amplifier so as to detect the phase modulation.
22. The method of any one of aspects 15-21 comprising controlling at least some of a plurality of optical components of the AFM using a computer system.
23. The method of aspect 22 comprising optimizing the controlling by using a machine learning process and a locking process.
24. In another aspect, a truncated non-linear interferometer-based sensor system comprises:
    an input port to which an optical beam is received;
    a non-linear amplifier that amplifies the optical beam with a pump beam and that renders a probe beam and a conjugate beam;
    local oscillators having a measurable relationship with the probe beam and the conjugate beam;
    a sensor, wherein the sensor's input is transduced by both the probe beam and the conjugate beam as a respective change in phase of each of the probe beam and the conjugate beam;
    one or more phase-sensitive detectors configured to
        detect corresponding phase modulations between the respective local oscillators and the probe beam and the conjugate beam, each detected phase modulation corresponding to the changes in phase, and
        output one or more phase signals based on the detected phase modulations; and
    measurement circuitry configured to measure a combination of the phase signals that is indicative of the sensor's input, the combination being one of a sum or difference of the phase signals, the measured combination being one or more signals that exhibit quantum noise reduction in either the intensity difference or phase sum or amplitude difference quadrature, respectively.
25. The system of aspect 24 where the local oscillators have a measurable relationship with the optical beam.
26. The system of aspect 25 where the local oscillators are phase locked with the optical beam.
27. The system of aspect 24 where a phase difference between the local oscillators and the probe beam and the conjugate beam is measurable.
28. The system of aspect 27, where the local oscillators are phase locked to the probe and conjugate beams.
29. The system of aspect 24 where the sensor induces phase shifts in both local oscillators.
30. The system of aspect 24, comprises
    a plurality of sensors,
    where the non-linear amplifier renders multiple spatial modes of the probe beam and the conjugate beam, and
    where, for each of the multiple sensors, the sensor is disposed in a beam path of a respective spatial mode of the probe beam and a beam path of the same spatial mode of the conjugate beam, and induces phase shifts in both a probe-beam spatial mode the conjugate-beam spatial mode.
31. The system of aspect 24, comprises
    a plurality of sensors,
    where the non-linear amplifier renders multiple spatial modes of the probe beam, the conjugate beam, and the local oscillators, and
    where, for each sensor of the plurality of sensors, the sensor is disposed in a beam path of a respective spatial mode of the probe beam and a beam path of the same spatial mode of the conjugate beam, and induces phase shifts in both the probe-beam spatial mode the conjugate-beam spatial mode.

32. The system of any one of aspects 15-31 where the sensor comprises a cantilever probe, and the system is configured as an atomic force microscope.

33. The system of any one of aspects 15-31 where the sensor comprises a plasmonic or metamaterial sensor.

34. The system of any one of aspects 15-31 where the sensor comprises a magnetometer.

35. The system of any one of aspects 15-31 where the sensor comprises an imaging sensor.

36. The system of any one of aspects 15-35 where the local oscillators serve as phase references for the one or more detectors.

37. The system of any one of aspects 15-36 where the one or more detectors comprise homodyne detection devices.

38. The system of any one of aspects 15-37 where the pump beam comprises a laser beam.

39. In another aspect, a method of operating a truncated non-linear interferometer-based sensor system comprises:
    coupling an optical beam to a non-linear amplifier so as to amplify the optical beam with a pump beam that renders a probe beam and a conjugate beam;
    generating two local oscillators that are phase locked to the probe and conjugate beams;
    inducing a phase shift in both the probe beam and the conjugate beam or in both local oscillators by coupling the probe beam and the conjugate beam to a sensor, wherein the sensor's input is transduced by the probe beam and the conjugate beam into the phase shift;
    detecting, by one or more phase-sensitive detectors, corresponding phase modulations between the respective local oscillators and the probe beam or the conjugate beam, wherein each detected phase modulation corresponds to the phase shift and is output as one or more phase signals based on the detected phase modulations; and
    measuring one or both of the sum and difference of the phase signals, resulting in one or more signals that exhibit quantum noise reduction in either a phase sum or amplitude difference quadrature, respectively.

40. The method of aspect 39 where an intensity of phase modulation represents a phase difference between the one of the local oscillators and the probe beam or the conjugate beam.

41. The method of aspect 39 comprising coupling the sensor to the non-linear amplifier to induce the phase shift in both the probe beam and the conjugate beam.

42. The method of any one of aspects 39-41 comprising coupling homodyne detection devices to the non-linear amplifier so as to detect the phase modulation.

43. The method of any one of aspects 39-42 comprising controlling at least some of a plurality of optical components of the truncated non-linear interferometer-based sensor system using a computer system.

44. The method of aspect 43 comprising optimizing the controlling by using machine learning, and/or various locking techniques.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims. Such systems include all variations of the system which include linear optics networks integrated into them, or amplitude or phase modulation techniques included at any point in the system. All systems with phase or amplitude modulators or linear optics included at any point in the disclosed NLI AFMs, before or after the NLI are equivalent systems to the disclosed system.

What is claimed is:

1. A truncated non-linear interferometer-based sensor system comprising:
   an input port to which an optical beam is received;
   a non-linear amplifier that amplifies the optical beam with a pump beam and that renders a probe beam and a conjugate beam;
   local oscillators having a measurable relationship with the probe beam and the conjugate beam;
   a sensor, wherein a sensor's input is transduced by the probe beam or the conjugate beam or their respective local oscillators as a change in phase of a relevant optical beam;
   one or more phase-sensitive detectors configured to
      detect a phase modulation between the respective local oscillators and the probe beam and the conjugate beam, the detected phase modulation corresponding to the change in phase, and
      output one or more phase signals based on the detected phase modulation; and
   measurement circuitry configured to measure a combination of the phase signals that is indicative of the sensor's input, the combination being one of a sum or difference of the phase signals, a measured combination being one or more signals that exhibit quantum noise reduction in either an intensity difference or phase sum or amplitude difference quadrature, respectively.

2. The sensor system of claim 1 where the local oscillators have a measurable relationship with the optical beam.

3. The sensor system of claim 2 where the local oscillators are phase locked with the optical beam.

4. The sensor system of claim 1 where a phase difference between the local oscillators and the probe beam and the conjugate beam is measurable.

5. The sensor system of claim 4, where the local oscillators are phase locked to the probe and conjugate beams.

6. The sensor system of claim 1 where the sensor induces a phase shift in the probe beam or in the conjugate beam.

7. The sensor system of claim 1 where the sensor induces a phase shift in one of the local oscillators.

8. The sensor system of claim 1, comprises
   a plurality of sensors,
   where the non-linear amplifier renders multiple spatial modes of the probe beam and the conjugate beam, and
   where the sensor comprises a plurality of sensors disposed in beam paths of the multiple spatial modes of the probe beam, respectively, and induce phase shifts in the multiple spatial modes of the probe beam.

9. The sensor system of claim 1, comprises
   a plurality of sensors,
   where the non-linear amplifier renders multiple spatial modes of the probe beam and the conjugate beam, and
   where the sensor comprises a plurality of sensors that are disposed in beam paths of a plurality of conjugate-beam spatial modes, respectively, and induce phase shifts in the plurality of conjugate-beam spatial modes.

10. The sensor system of claim 8, comprises
    a plurality of sensors, where
    the non-linear amplifier renders multiple spatial modes of the local oscillators, and the plurality of sensors is disposed in beam paths of a plurality of local-oscillator spatial modes, respectively, and induce phase shifts in the plurality of local-oscillator spatial modes.

11. The sensor system of claim 1 where the local oscillators serve as phase references for the one or more phase-sensitive detectors.

12. The sensor system of claim 1 where the one or more phase-sensitive detectors comprise homodyne detection devices.

13. The sensor system of claim 1 where the pump beam comprises a laser beam.

14. The sensor system of claim 1 where
the sensor comprises a cantilever probe, and
the truncated non-linear interferometer-based sensor system is configured as an atomic force microscope.

15. The sensor system of claim 1 where
the sensor comprises a plasmonic or metamaterial sensor.

16. The sensor system of claim 1 where
the sensor comprises a magnetometer.

17. The sensor system of claim 1 where
the sensor comprises an imaging sensor.

18. A method of operating a truncated non-linear interferometer-based sensor system, the method comprising:
coupling an optical beam to a non-linear amplifier so as to amplify the optical beam with a pump beam that renders a probe beam and a conjugate beam;
generating two local oscillators that have a measurable relationship with the probe beam and the conjugate beam are phase locked to the probe and conjugate beams;
inducing a phase shift in the probe beam or the conjugate beam or their associated local oscillators by coupling a relevant optical beam to a sensor, wherein a sensor's input is transduced by the relevant optical beam into the phase shift;
detecting, by one or more phase-sensitive detectors, a phase modulation between the respective local oscillators and the probe beam or the conjugate beam, wherein a detected phase modulation corresponds to the phase shift and is output as one or more phase signals; and
measuring one or both of a sum and difference of the phase signals, resulting in one or more signals that exhibit quantum noise reduction in either an intensity difference or phase sum or amplitude difference quadrature, respectively.

19. The method of claim 18 where an intensity of the phase modulation represents a phase difference between the one of the local oscillators and the probe beam or the conjugate beam.

20. The method of claim 18 comprising coupling the sensor to the non-linear amplifier to induce the phase shift in the probe beam or the conjugate beam.

21. The method of claim 18 comprising coupling the sensor to the non-linear amplifier to induce the phase shift in one of the local oscillators.

22. The method of claim 18 comprising inducing the phase shift in the probe beam or the conjugate beam.

23. The method of claim 18 comprising inducing the phase shift in one of the local oscillators.

24. The method of claim 18 comprising coupling homodyne detection devices to the non-linear amplifier to detect the phase modulation.

25. The method of claim 18 comprising
controlling at least some of a plurality of optical components of the truncated non-linear interferometer-based sensor system using a computer system.

26. The method of claim 25 comprising optimizing the controlling by using a machine learning process and a locking process.

* * * * *